Dec. 29, 1936.	R. M. STEPHENS ET AL	2,066,163
WELDING APPARATUS
Filed Nov. 20, 1934	2 Sheets-Sheet 1
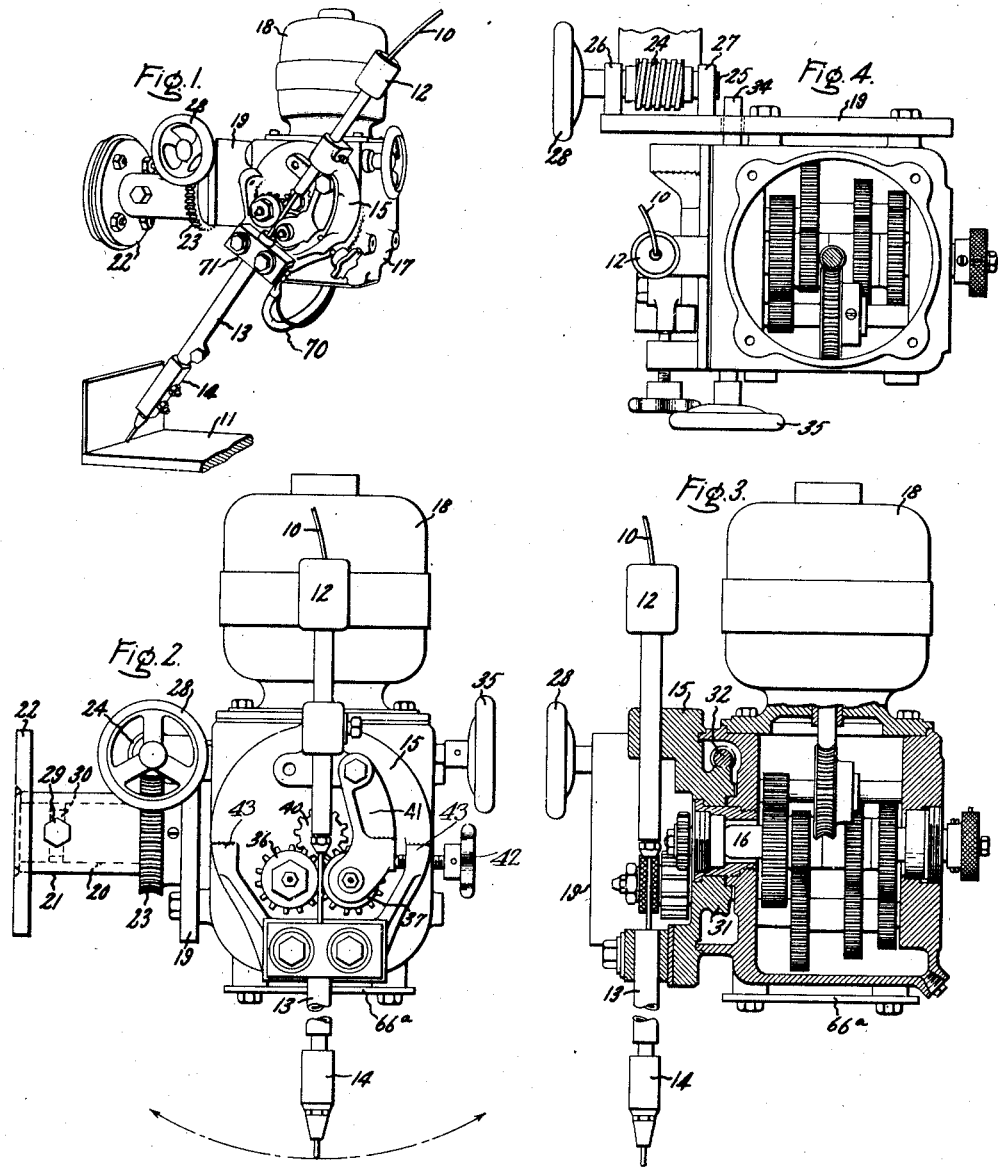
Inventors:
Robert M. Stephens,
Verni J Chapman,
by Harry E. Dunham
    Their Attorney.

Dec. 29, 1936.  R. M. STEPHENS ET AL  2,066,163
WELDING APPARATUS
Filed Nov. 20, 1934  2 Sheets-Sheet 2
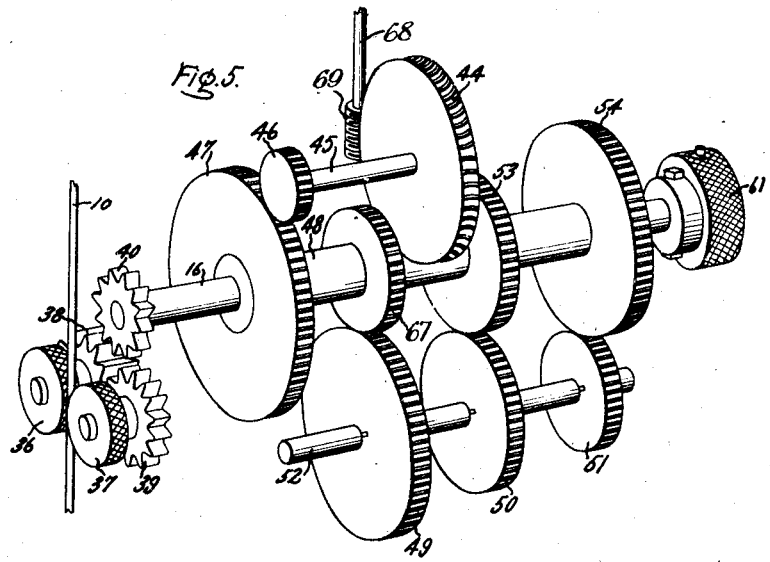
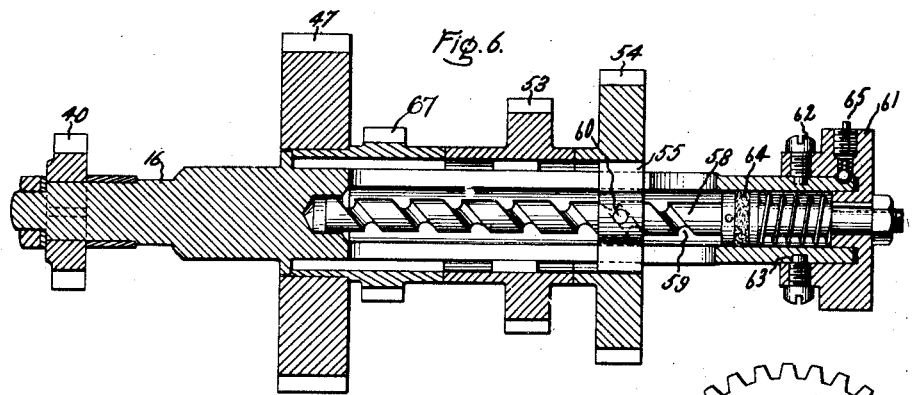
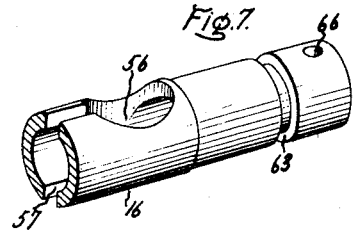
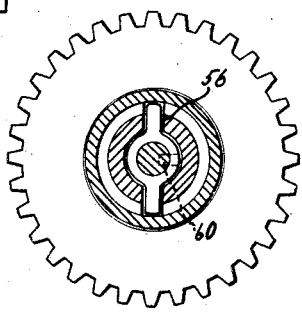
Inventors:
Robert M. Stephens,
Verni J. Chapman,
by Harry E. Dunham
Their Attorney.

Patented Dec. 29, 1936

2,066,163

UNITED STATES PATENT OFFICE 2,066,163

WELDING APPARATUS

Robert M. Stephens, Scotia, and Verni J. Chapman, Schenectady, N. Y., assignors to General Electric Company, a corporation of New York Application November 20, 1934, Serial No. 753,860

4 Claims. (Cl. 219—8)

Our invention relates to welding apparatus, and more particularly to automatic arc welding apparatus.

In automatic arc welding apparatus means are provided for feeding an electrode to the work being welded at a rate commensurate with its consumption in the arc during the welding operation. Usually this means is responsive to a characteristic of the welding circuit and functions to feed the electrode to and from the work to strike and thereafter maintain the welding arc. This feeding means is commonly referred to as a welding head.

It is an object of our invention to provide a welding head in which the arrangement of parts are such that it may be mounted in either a right or a left-hand position by a rearrangement of certain parts.

It is a further object of our invention to provide an automatic arc welding head in which the electrode is adjustable in two planes about axes that intersect one another in the longitudinal axis of the electrode. When these planes are at right angles to one another it is possible to move the arcing tip of the electrode to any point on the inside surface of a spherical segment by properly adjusting the welding head about the intersecting axes of adjustment.

Further objects of our invention will become apparent from the following description of the embodiment thereof illustrated in the accompanying drawings.

In the drawings the welding head illustrated in perspective in Fig. 1 is further illustrated by front, side sectional, and top views in Figs. 2, 3 and 4. In Fig. 4 the feed motor has been removed to show the speed changing gearing also shown in Fig. 3. Fig. 5 is a diagrammatic representation of this gearing by means of which the feed motor is connected to the feed rolls, Fig. 6 is a sectional view of the main shaft of the gearing of Fig. 5, which illustrates in detail the key shifting mechanism employed for selectively connecting the gears mounted on said shaft in driving engagement therewith; and Figs. 7 and 8 are detail views further illustrating the construction of the main shaft and key shifting mechanism of Fig. 6.

Referring to the first sheet of the drawings, it will be noted that the welding electrode 10 is fed to the work 11 through an electrode guide 12, a nozzle extension 13, and a nozzle 14. These members 12, 13 and 14 constitute an electrode guiding means which is located on a plate-like member 15 mounted for rotation about the longitudinal axis of a spindle 16. This guiding means directs the electrode across the axis of rotation of this spindle which extends through the front wall of an enclosure 17 upon the top of which is mounted a motor 18 which is connected to the spindle through a speed changing mechanism located within the enclosure. This enclosure is mounted on a supporting member 19 having a shaft 20 located in a bearing 21 provided with a mounting flange 22. The welding head as a whole may be rotated in the bearing 21 about an axis which is at right angles to or substantially at right angles to and intersects in the electrode 10 the axis of rotation of the spindle 16. It will thus be seen that the welding electrode supported in the welding head is adjustable in two planes at right angles to one another about axes which intersect one another at right angles or substantially at right angles in the longitudinal axis of the electrode, thus making it possible to adjust the arcing tip of the electrode along the inside surface of a sphere having as its center the point of intersection of the axes of adjustment.

The adjustment of the welding head as a whole about the axis determined by the shaft 20 and bearing 21 is accomplished through the agency of a worm wheel 23 attached to the outside surface of the bearing 21 and a worm 24 supported on a shaft 25 mounted in brackets 26 and 27 attached to the supporting member 19. The shaft 25 and worm 24 may be rotated by means of a hand-wheel 28. Rotation of the worm 24 will cause the supporting member 19 to swing about the axis of shaft 20 in bearing 21. The shaft 20 is held within its bearing 21 by means of a set screw 29 the end of which engages a groove 30 in the shaft 20. The bearing 21 is suitably supported through the agency of flange 22 which furnishes a mounting for the welding head and its adjustable supporting means.

The plate 15 may be adjusted about the axis of the spindle 16 through the agency of a worm drive comprising worm wheel 31 and worm 32. In the drawings, the worm wheel 31 forms an integral part of the plate 15 and the worm wheel and plate are rotated by the rotation of the worm 32 which is mounted on a shaft 34 supported in the walls of the enclosure 17. Each end of the shaft 34 extends beyond the side walls of the enclosure 17 a sufficient distance to provide a mounting for a hand-wheel 35 by means of which the shaft may be rotated. In order to accommodate the projecting end of the shaft 34 to which the hand-wheel is not attached, suitable openings must be provided in its supporting member 19, as illustrated in Fig. 4.

The electrode 10 is fed through the electrode guiding means by feed rolls 36 and 37, which are connected by gears 38, 39, and 40 to the spindle 16 (see Fig. 5). The gear 38 is of sufficient width to mesh with both gears 39 and 40, when these gears are longitudinally displaced into a non-interfering position. The feed roll 36 and its gear 38 may be supported on the plate 15 on either side of the electrode guiding means. The feed roll 37 and its gear 39 are supported in the bifurcated end portion of a lever 41, the other end of which may be pivotally attached to the plate 15 on either side of the electrode guiding means. These feed rolls are lubricated through the agency of fittings mounted on the exposed ends of their supporting shafts. These fittings may be of the type adapted to cooperate with a detachable force feed device now commonly used for lubrication purposes. The feed rolls are pressed into engagement with the electrode 10 by means of a pressure exerting means illustrated in the drawings as a screw 42. This screw is interchangeably located in threaded lugs 43 forming a part of the plate 15.

A left-hand mounting of the welding head has been illustrated in the drawings. By reason of the interchangeability of parts on the front plate 15 and the possibility of attaching either the right or left-hand side walls of the enclosure 17 to the supporting member 19, the welding head is also adapted for right-hand mounting. The side walls of enclosure 17 are provided with threaded bosses for the bolts by means of which the enclosure is attached to the supporting member 19. In order to mount the welding head from the right-hand side instead of the left-hand side as illustrated, the screw 42 and hand-wheel 35 are removed and the right-hand surface of the enclosure 17 is attached to the supporting member 19 after this member has been rotated through 180 degrees. The hand-wheel 35 is then applied to the other end of the shaft 34 and the screw 42 then inserted in the other lug 43. The positions of the feed rolls 36 and 37 with their gears and supporting means are then reversed so that for right-hand mounting the several parts have the same relative arrangement as illustrated in the drawings which show the left-hand mounting.

The direction and speed of rotation of the feed motor 18 is suitably controlled to feed the electrode toward the work as it is consumed during the welding operation. Various systems may be employed for accomplishing this result. For example, the system illustrated and described in our Patent No. 1,936,129 issued October 17, 1934, may be used. The control equipment will function most satisfactorily when the gear reduction between the feed motor and the spindle 16 is most suitable for the size of electrode, the welding current, and the arcing voltage employed. Thus, in the welding head illustrated, a speed changing mechanism is provided by means of which three basic speeds are provided. For each speed reduction the feed motor 18 under the action of its control will automatically adjust the electrode feeding rate to the exact rate of electrode consumption.

The gear reduction is shown in Fig. 5. The motor 18 drives a high speed gear 67 through its shaft 68, worm 69, worm wheel 44, shaft 45, spur gears 46 and 47 and shaft 48. This gear in turn drives gears 49, 50 and 51 mounted on and keyed to the jack shaft 52. Gear 50 drives an intermediate speed gear 53 and gear 51 drives a low speed gear 54. Gears 57, 53, and 54 are mounted on the spindle shaft 16 to which they may be connected by a shift key 55. This key is inserted through an opening 56 into spindle 16 so that its ends extend through slot 57 into a keyway engaging position for gears 54, 53 and 67. The key is shifted lengthwise of the slot 57 by a shift pin 58 which is provided with a spiral groove 59 into which extends a pin 60 attached to the key 55. The shift pin 58 is rotated by a handle 61 which is rotatably mounted on one end of the spindle 16 and held in position thereon by screws 62 the ends of which engage a groove 63 in that end of the spindle. A packing 64 prevents the passage of lubricant along the shift pin 58. An indicator 65 is provided in the handle 61 to show when the key 55 is in a gear engaging position, or in an intermediate neutral position between two gear engaging positions. This indicator comprises a pin, the end of which is spring pressed into a depression 66 in the surface of the end-portion of spindle 16 when the shift pin 37 has been rotated to a position in which the key 58 is either in the gear engaging position or in a neutral position. This indexing device also prevents the key from moving out of engagement with any particular gear when adjustment has been completed. It is to be noted that the rear end of the spindle 16 extends through the rear wall of the enclosure 17 thus placing the handle 61 at the rear of the enclosure 17.

The speed changing gearing above described is supported by its shafts within the gear box or enclosure 17. These gears are immersed in lubricant placed within the gear box. A heat shield 66a attached to the lower portion of the gear box is provided for shielding the same from the direct heat of the welding arc.

Welding current is supplied to the electrode 10 through a conductor 70 which is attached to the support 71. This support is insulated from the plate 15 to confine the passage of the welding current to the nozzle extension 13 and nozzle 14. The nozzle 14 is illustrated as having the construction of Patent No. 1,959,194, Chapman, issued May 15, 1934. By using nozzle extensions 13 of different lengths the welding head is adapted for various welding operations. It is to be understood, however, that the nozzle 14 may be inserted in and supported by the nozzle support 71, or that a nozzle of great length may be used in place of the nozzle illustrated in the drawings. For this reason the support 71 may be properly referred to as a nozzle support. The flow of welding current through the welding head is prevented by suitably insulating the flange 22 and bearing 21 from its support.

Our invention is not limited to the particular embodiment illustrated and described above. Many changes may be made without departing from the spirit and scope of our invention. Thus, while we have shown our invention as applied to an automatic arc welding machine, it is to be understood that certain features of our invention may be applied equally well in other welding machines where the welding agency is supported for adjustment in two planes at right angles to each other about axes which intersect one another in the longitudinal axis of the welding agency. We believe, however, that our invention will find its greatest application in automatic arc welding apparatus such as described above where the arrangement and interchangeability of parts characteristic of our invention is of importance in that it adapts the welding head for mounting in either right or left-hand positions. Thus, while we have shown and described but one embodiment of our invention, it will be understood that other embodiments will occur to those skilled in the art, and we therefore intend to cover by the following claims all modifications of our invention which fall within the true spirit and scope thereof.

What we claim as new and desire to secure by Letters Patent of the United States is:

1. Welding apparatus comprising a gear box adapted for mounting in either a right or a left hand position, a speed changing gear reduction in said gear box, a spindle connected to said gear reduction and projecting from said gear box, means supported on said gear box and responsive to a characteristic of a welding arc for rotating said spindle through said gear reduction in the proper direction and at the proper speed for striking and maintaining a welding arc, a plate supported on said gear box for rotation about the projecting end of said spindle, means reacting against said gear box for rotating said plate about said spindle, means supported on said plate for guiding an electrode across the axis of rotation of said spindle, means for supplying welding current to said electrode, a plurality of feed rolls, means forming a driving connection between said spindle and one of said feed rolls, means for supporting said gear box, and means for rotating said last mentioned means about an axis at right angles to and intersecting the axis of said spindle in the electrode supported in said guiding means.

2. Welding apparatus comprising a member adapted for mounting in either a right or left-hand position, a spindle supported on said mounting member, means supported on said mounting member and responsive to a characteristic of a welding arc for rotating said spindle in the proper direction and at the proper speed for striking and maintaining a welding arc, a plate supported for rotation about said spindle, means supported on said plate for guiding an electrode across the axis of rotation of said spindle, means for supplying welding current to said electrode, a plurality of feed rolls, gears forming a driving connection between said spindle and one of said feed rolls, means for supporting one of said feed rolls on said plate on either side of said guiding means, a lever, means for supporting the other feed roll on said lever, means for pivotally attaching said lever to said plate on either side of said guiding means, means for exerting pressure on said lever and for forcing said feed rolls into engagement with an electrode supported in said guiding means, means supported on said plate on either side of said guiding means for engaging said pressure exerting means, and means for rotating said plate and mounting member about an axis at right angles to and intersecting the axis of said spindle in the electrode supported in said guiding means.

3. Welding apparatus comprising an enclosure, a spindle extending through the front wall of said enclosure, a motor mounted on top of said enclosure, speed changing mechanism in said enclosure connecting the shaft of said motor to said spindle, means extending through the wall of said enclosure for operating said speed changing mechanism, a plate supported on the front wall of said enclosure for rotation about said spindle, means including a shaft supported on said enclosure and having end portions extending beyond the side walls thereof for rotating said plate about said spindle, a hand-wheel, means for attaching said hand-wheel to either end of said shaft, an electrode guide supported on the upper portion of said plate, a nozzle, a nozzle support attached to and insulated from the lower portion of said plate, means for supplying welding current to said support and to said nozzle, a plurality of feed rolls, a gear on said spindle and gears on said feed rolls, one of said gears being of sufficient width to mesh with the gear on the other feed roll and the gear of said spindle when said gears are in non-interfering positions, means for supporting on said plate on either side of said electrode guide the feed roll with the gear of greater width, a lever, means for supporting the other feed roll and its gear on said lever, means for pivotally attaching said lever on said plate on either side of said electrode guide, means for exerting pressure on said lever and for forcing said feed rolls into engagement with an electrode supported in said electrode guide, means supported on said plate on either side of said electrode guide for engaging said pressure exerting means, a support, means for attaching either of the side walls of said enclosure to said support, and means including a hand-wheel for rotating said support and said enclosure about an axis which is at right angles to and intersects the axis of said spindle in the electrode supported in said electrode guide.

4. Welding apparatus comprising a support member, a gear box having right and left hand side walls adapted to be connected to said supporting member, removable means for connecting either one of said side walls to said supporting member, a spindle extending through the front wall of said gear box, a motor on top of said gear box, speed changing gearing in said gear box connecting the shaft of said motor to said spindle, means extending through the rear wall of said gear box for operating said speed changing gearing, a plate supported on said gear box for rotating about said spindle, means including a shaft supported on said gear box and having end portions extending beyond the side walls thereof for rotating said plate about said spindle, a hand wheel, means for attaching said hand wheel to either end of said shaft, an electrode guide supported on the upper portion of said plate, a nozzle, a nozzle support attached to and insulated from the lower portion of said plate, means for supplying welding current to said nozzle support, a plurality of feed rolls, a gear on said spindle, gears on said feed rolls, one of which is of sufficient width to mesh with the gear of the other feed roll and the gear of said spindle when said last mentioned gears are in non-interfering positions relative to one another, means for supporting one of said feed rolls and its gear on said plate on either side of said electrode guide, a lever, means for supporting the other feed roll and its gear on said lever, means for pivotally attaching said lever on said plate on either side of said electrode guide, means for exerting pressure on said lever and for forcing said feed rolls into engagement with an electrode supported in said electrode guide, lugs on said plate on opposite sides of said electrode guide for engaging said pressure exerting means, and means including a hand wheel for rotating said support in said gear box about an axis which is at right angles to and intersects the axis of said spindle in the electrode supported in said electrode guide.

ROBERT M. STEPHENS.
VERNI J. CHAPMAN.